United States Patent [19]
Tsujioka et al.

[11] Patent Number: 4,626,838
[45] Date of Patent: Dec. 2, 1986

[54] FILLED SHAPED GENERATING APPARATUS

[75] Inventors: Shigeo Tsujioka, Higashiyamato; Seiichi Kanema, Tokyo; Eiji Okamura, Owariasahi; Kiyoshi Umezawa, Nagoya; Mitsuo Ooyama, Hachioji; Toshihisa Aoshima, Tokyo; Mitsugu Yoneyama, Tokorozawa, all of Japan

[73] Assignee: Hitachi, Ltd., Tokyo, Japan

[21] Appl. No.: 541,444

[22] Filed: Oct. 13, 1983

[30] Foreign Application Priority Data

Oct. 18, 1982 [JP] Japan .................. 57-181311

[51] Int. Cl.⁴ ........................................... G09G 1/00
[52] U.S. Cl. .................................. 340/744; 340/747; 340/728
[58] Field of Search ............... 340/701, 703, 744, 747, 340/729, 728

[56] References Cited

U.S. PATENT DOCUMENTS

| | | | |
|---|---|---|---|
| 4,189,743 | 2/1980 | Schure et al. | 340/747 |
| 4,368,463 | 1/1983 | Quilliam | 340/744 |
| 4,481,594 | 11/1984 | Staggs et al. | 340/701 |

OTHER PUBLICATIONS

"The Edge Flag Algorithm-A Fill Method for Raster Scan Displays", IEEE Transactions on Computers, vol. C-30, No. 1, Jan., 1981, Agkland & Weste.

*Primary Examiner*—Gerald L. Brigance
*Attorney, Agent, or Firm*—Antonelli, Terry & Wands

[57] ABSTRACT

An apparatus for filling an interior of a shape to be displayed on a raster scan CRT which reads out a refresh memory. The apparatus includes a memory for storing information of starting points and ending points for filling. The write of a filling color code into the refresh memory is initiated and terminates in response to the filling starting point and the filling ending point, respectively, but inhibited at its memory locations on the contour of the shape. The direction of the filling is perpendicular to the raster scanning of the CRT.

8 Claims, 18 Drawing Figures

FILLED SHAPED GENERATING APPARATUS

BACKGROUND OF THE INVENTION

This invention relates to an apparatus for generating a shape having a contour filled in the interior of the contour by using the contour position in a two-dimensional area as input information, and is applicable to a color graphics display employing a raster scan CRT (cathode ray tube).

In the conventional filled shape generating apparatus, a shape is scanned in one direction to fill the interior of a contour in each scan from a point where a scan line intersects the contour to a next point where it intersects the contour again. However, this method is disadvantageous in that in case where the interior of the contour is filled by X-coordinate direction scanning of X-Y coordinates shown in FIG. 1, lattice dots, (2,7) to (7,7), (7,6), (7,4), (7,2) and (2,1) to (7,1) are undesireably filled due to the existence of particular dots $P_1(1,7)$, $P_2(6,6)$, $P_3(4,4)$, $P_4(6,2)$ and $P_5(1,1)$. One method of filling an area containing these particular dots has been proposed in Japanese Patent Laid-Open No. Sho 55-10656 as "shape filling method and apparatus". In this proposed method, there are provided registers storing the X-coordinate positions of lattice dots, the number of the registers corresponding to the number of dots arranged in Y-coordinate direction. Whenever a series of coordinates positions of dots constituting a contour are generated, the X-coordinate position of a dot other than the particular dots is successively loaded in a register corresponding to the Y-coordinate position of the dot. When the register which has already been loaded is to be loaded again, the filling is carried out by inverting the dots between the coordinates positions of the previously loaded dot and the newly loaded dots. However, this method carries out an erroneous filling. For example, when there are plural areas to be filled separated in a Y-coordinate direction, such as a concave shape, filling operation is correctly returned to an original state (black or white) by the inversions of even times for a monochromatic image display. However, if the areas are filled with a color code for a color image display, an erroneous filling is carried out. This occurs because the filling operation is carried out in this method whenever a dot belonging to the contour is generated without considering the resultant entire contour. Further, the contour extending in X direction may be filled or not filled depending on the advancing directions of the contour before and after the extending contour, and so it is impossible to fill only the interior of the contour correctly. To obviate such a defect, there is proposed a method of filling in which only the contour is once stored in a working plane or memory, and intersecting points with the contour are obtained in a software manner for each scan line, and the areas are filled between the intersecting points after the entire contour is completed. This method is disclosed in an article; B. D. Ackland and N. H. Weste "The Edge Flag Algorithm—A Fill Method for Raster Scan Display" IEEE Trans. on Comp. Vol. C-30 No. 1, January 1981. This method is disadvantageous in that this requires long processing time since it is necessary to refer to the lattice dot information other than the scan line to remove the particular dots.

For high speed displaying, the raster scan type CRT requires a refresh memory so as to be accessible in parallel to plural dots arranged in X-direction (the direction of the raster scan) in the refresh memory, and generates a video signal after the parallel-serial conversion of the readout plural dots. If the filling is effected in the X-direction for the refresh memory of such a memory construction, only one specific dot of the readout plural dots is filled at a time, but plural dots can not be filled in parallel. This disadvantageously impedes high speed filling.

Further, when another shape overlaps the shape as, for example, shown in FIG. 1 at portion, the contour of the shape previously generated is erased due to filling of a new shape.

SUMMARY OF THE INVENTION

This invention is aimed at removing the above mentioned defects.

One object of this invention is to provide a graphic processing apparatus which enables to receive a contour data of an area generated as an array of dots on a two dimensional axis thereby to fill the lattice dots encircled by the array and to fill only the interior of the contour at high speed for any shape such as a concave, convex, doughnut or shape having a constriction.

Another object of this invention is to provide a graphic processing apparatus which prevents a previously generated contour from being filled by a subsequently generated contour.

Further object of this invention is to provide a high speed filled shape generating apparatus which enables the parallel filling for plural picture elements or dots on a display.

To this end, according to one aspect of this invention, there are provided a contour memory holding a contour information, a circuit for eliminating particular dot components, i.e., maximum/minimum and vertical (perpendicular to the raster scanning direction) dot components from the contour information, and a filling starting/ending memory for holding remaining dots after the elimination of the particular dots as well as a refresh memory storing a shape information. Further this invention includes a filling circuit for carrying out the filling in the direction vertical to the direction of scanning for display (raster scanning direction) on the basis of the contents of the contour memory and the filling starting/ending memory. Thus, this invention enables high speed filling of the area of any shape.

BRIEF DESCRIPTION OF THE DRAWINGS

FIG. 8 shows a wiring diagram of a filling starting-/ending generating circuit in FIG. 6a.

FIG. 12 is a flowchart of operation of a line segment generating circuit shown in FIG. 6a.

DESCRIPTION OF THE PREFERRED EMBODIMENTS

Figure 1:
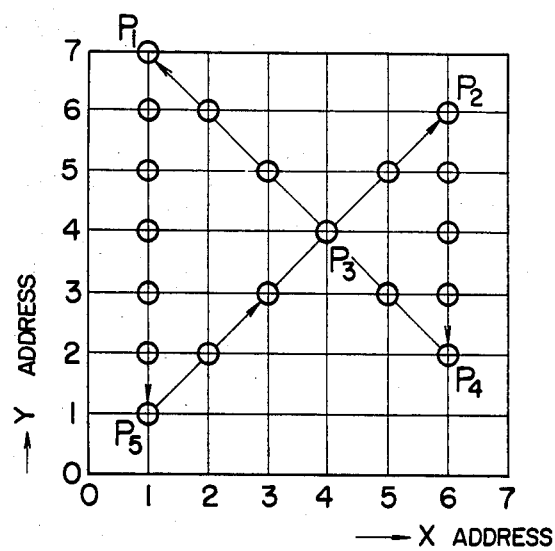
FIG. 1 shows an array of dots of a contour.

One embodiment of this invention will be explained referring to the case of filling the interior of the contour shown in FIG. 1. Explanation will be first on the operation or principle of filling and subsequently a filling circuit of the hardware in practical use. FIG. 2 shows a principle or operation of filling. In FIG. 2, numeral 201 denotes a line segment generating circuit incorporating a microprocessor, 202 a filling starting/ending point generating circuit, 203 a contour memory, 204 a filling starting/ending point memory, 205 a filling circuit, and 206 a refresh memory. Explanation will be made on the operation of generating a filled shape in the refresh memory 206.

The refresh memory 206 holds l-bits display color code for m×n pixels arranged two-dimensionally and is constructed by a memory consisting of m×n meshes with the depth of l-bits. The contour memory 203 holds one bit data which represents whether or not each pixel is on the contour of a shape to be displayed and thus is constructed by a memory of m×n meshes with one bit depth. The filling starting/ending point memory 204 holds one bit data which represents that each pixel is the first pixel (starting point) or final pixel (ending point) of an array of successive plural pixels to be filled sequentially and is constructed by a memory of m×n meshes with one bit depth.

First, the line segment generating circuit 201 generates addresses or coordinates positions ($x_k$, $y_k$) of series of dots $P_k$(k=1, 2 . . . ) of the contour developed on two dimensionally arranged lattice dots for each contour in the order of circulating the entire contour. The advancing direction of the circulation is optional but the circulation of the entire contour must be attained by all means.

The address ($x_k$, $y_k$) of a dot on the contour of a shape is a data of integer which satisfies the formulas:

$$1 \leq x_k \leq m, 1 \leq y_k \leq n \\ -1 \leq x_k - x_{k-1} \leq 1, -1 \leq y_k - y_{k-1} \leq 1 \quad (1)$$

The addresses successively produced from the line segment generating circuit 201 are applied to the contour memory 203 and the refresh memory 206. The line segment generating circuit 201 further supplies the display color code of the contour to the refresh memory 206. The bits on the contour memory 203 corresponding to the above given addresses are set "1", while the display color code of the contour is written on the positions of the refresh memory 206 corresponding to the above addresses.

On the other hand, the filling starting/ending point generating circuit 202 determines whether the received address is either a starting point or ending point of the filling line. If affirmative, the filling starting/ending point generating circuit 202 inverts the data bit stored at the received address location of the filling starting/ending point memory 204. Thus, the bits at the addresses written odd number times are "1", while the bits at the addresses written even number times (including zero) are "0" in the memory 204.

Figure 2:
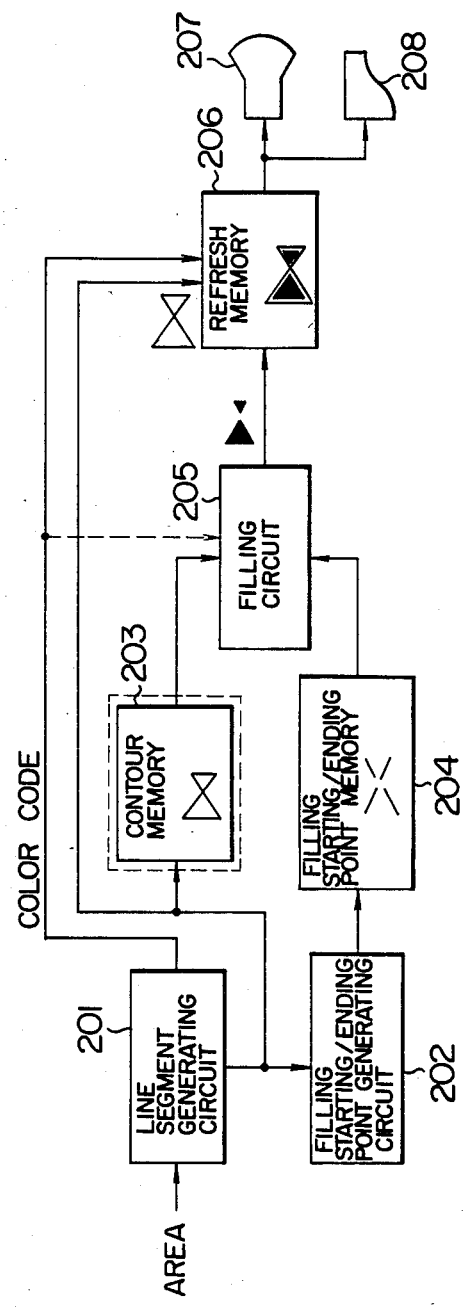
FIG. 2 is a block diagram for explaining the operation of filling.

The embodiment of this invention carries out the write of filling data of plural horizontal dots in the refresh memory 206 by scanning the refresh memory 206 in the vertical direction (perpendicular to the raster scanning direction) of FIG. 1. Practically, since a number of dots (e.g., 1024) are arranged in the horizontal direction in the refresh memory 206, the above vertical scanning is repeated in the horizontal direction by shifting the horizontal position of the vertical scanning toward +X direction. On the other hand, the scanning of the refresh memory 206 for display of a CRT 207 is horizontal raster scanning as usual. Thus, the direction of scanning the refresh memory 206 for filling is different from that for display. This is proposed for the purpose of high speed filling as will be described later. The scanning direction for filling is not directly related with the filling principle of this invention, but affects the operation of the filling starting/ending point generating circuit 202.

Figure 3A:
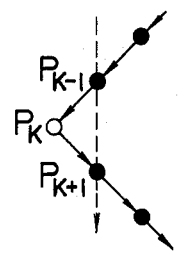
FIGS. 3a, 3b, 3c, 3d, 3e and 3f show arrays of particular dots.

In the shape shown in FIG. 3a, dots $P_{k-1}$, $P_{k+1}$ correspond to a filling starting and ending point, respectively when filled in a direction of a dotted arrow line. However, a dot $P_k$ corresponds to a minimum dot, one of the particular dots, as viewed in the X direction. Similarly, a dot $P_k$ in FIG. 3b corresponds to a maximum dot as viewed in the X direction. The filling starting/ending point generating circuit 202 inverts the bits of the filling starting/ending point memory 204 corresponding to the true starting and ending points, but does not invert those corresponding to the maximum and minimum dots.

Figure 4:
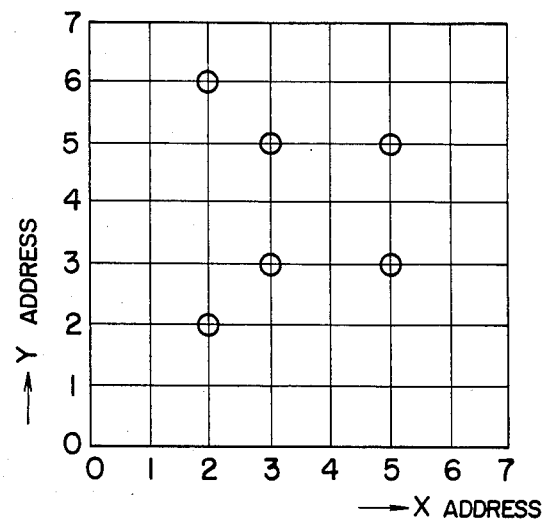
FIG. 4 shows an array of dots indicating starting-/ending points for filling.

The above mentioned operation is carried out for an entire contour of the shape shown in FIG. 1 with the result that the bit "1" is written at the addresses indicated with small circles in FIG. 4 in the filling starting-/ending point memory 638.

When the above operation ends for the entire shape, the filling circuit 205 is energized.

Figure 3B:
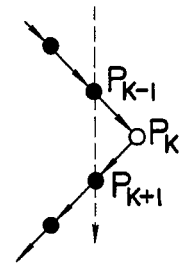
Figure 3C:
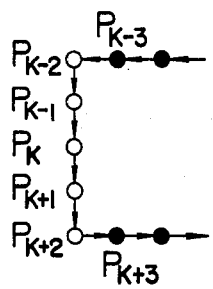
Figure 3D:
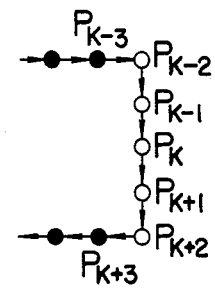
Figure 3E:
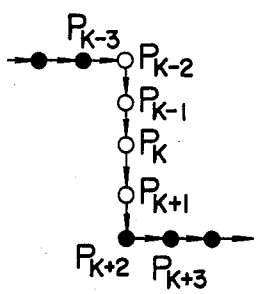
Figure 3F:
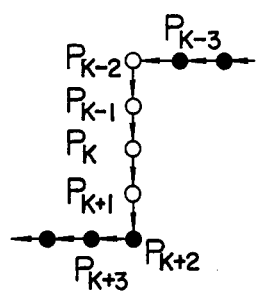
Figure 5:
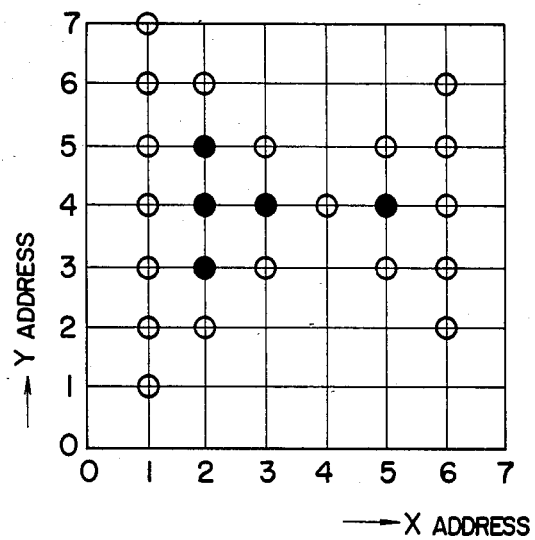
FIG. 5 shows an array of dots of a contour color code and filling color code on a refresh memory.

In the same manner, inversion is not exerted for a group of dots $P_{k-2}$ to $P_{k+2}$ arranged in the filling scanning direction (vertical direction in the figure) as shown in FIGS. 3c and 3d. However, when dots $P_{k-3}$ and $P_{k+3}$ located on both ends of the dot group $P_{k-2}$ to $P_{k+2}$ arranged in the filling scanning direction are different in the position (X position) perpendicular to the filling scanning direction, as shown in FIGS. 3e and 3f, an inverted write is effected for the final dot $P_{k+2}$ at the turning point of the group of these dots. The dots $P_{k-3}$ and $P_{k+3}$ shown in FIGS. 3c and 3d are the same in the X position and so the inverted write is not effected. The filling circuit 205 reads out from the contour memory 203 and the filling starting/ending memory 204 plural horizontal bits for respective columns (X addresses) in parallel from upside (the largest Y address) of the display, and sequentially reads out the horizontal bits downwards. When the data "1" is read out for a certain column at odd number times from the filling starting-/ending point memory 204, the filling circuit 205 starts to supply a filling signal for lattice dots on the same column from the starting point till a next lattice dot outputting the data "1" appears. However, if the data of the contour memory 203 corresponding to any lattice dots being supplied with the filling signal is "1", this filling signal is made invalid for the dot on the contour as described later. The refresh memory 206 permits the write of a filling color code therein only for the lattice dots supplied with the filling signal. Thus, the refresh memory 206 writes the filling color code for the lattice dots between the starting and ending points (exclusive) supplied from the filling starting/ending point memory 204, for each column. This processing is carried out for plural columns simultaneously, and if necessary is repeated to cover all the columns. Accordingly, the filling data shown in FIG. 5 as black circles are written into the refresh memory 206 when the interior of the contour shown in FIG. 1 is intended to be filled. In FIG. 5, the dots added with the white circles are those written by the display color code of the contour, while the dots added with the black circles are those written by the filling color code.

Thus, the processing for one shape ends. Further the contents of the starting/ending point memory are all cleared "0", and the above processing is intended to be repeated for another shape.

The refresh memory 206 storing the filling data are then read out by horizontal raster scanning and the read-out filling data is displayed on the CRT 207. Thus, there is displayed on the CRT a closed shape having a contour of any desired color and the interior filled with any desired color within the contour.

If the maximum and minimum dots as shown in FIGS. 3a and 3b were written in the filling starting-/ending point memory 204, the filling circuit 205 would supply the filling signal to lattice dots linking downwards from these maximum and minimum dots so that an unnecessary line (whisker) starting from the maximum or minimum dot is displayed.

FIGS. 3c and 3d correspond to a convex portion or concave portion of the closed shape. If dots arranged in the direction of filling scanning were written in the filling starting/ending point memory 204, similarly, a whisker might occur. Namely, if the final dot $P_{k+2}$ of the dots arranged vertically is at an odd number standing, a whisker starts downwards from the dot $P_{k+2}$. Thus, as shown in FIGS. 3c and 3d, an array of dots arranged in a vertical line should not be treated as a starting or ending point, as a rule.

However, as shown in FIGS. 3e and 3f, the group of dots arranged in the vertical direction between two contour segments each having a component extending in the horizontal direction must be treated distinguishably from the case of FIGS. 3c and 3d. Namely, another contour segment must always exist either above or below the contour segments and either lower dots from the dot $P_{k+2}$ or upper dots from the dot $P_{k-2}$ should be filled. In other words, the group of dots must always include either a starting point or ending point. The distinction between the shape of FIGS. 3e and 3f and that of FIGS. 3c and 3d can not be found till the coordinate position of a dot $P_{k+3}$ is specified. Thus, for a simplest way for the distinction according to this invention, the dots $P_{k-2}$ to $P_{k+1}$ are not treated as a starting point or ending point but only the dot $P_{k+2}$ in the shape of FIGS. 3e and 3f is treated as a starting point or ending point.

Incidentally, the inverting write to the starting/ending point memory 204 prevents a whisker from extending from the degenerated point (e.g., $P_3$ in FIG. 1) of the shape when displayed.

Explanation has been made on the operation or principle of filling. Next, one embodiment according to this invention will be explained in relation to the hardware for filling. One example of filling the interior of a contour as shown in FIG. 1 will be explained.

Figure 6A:
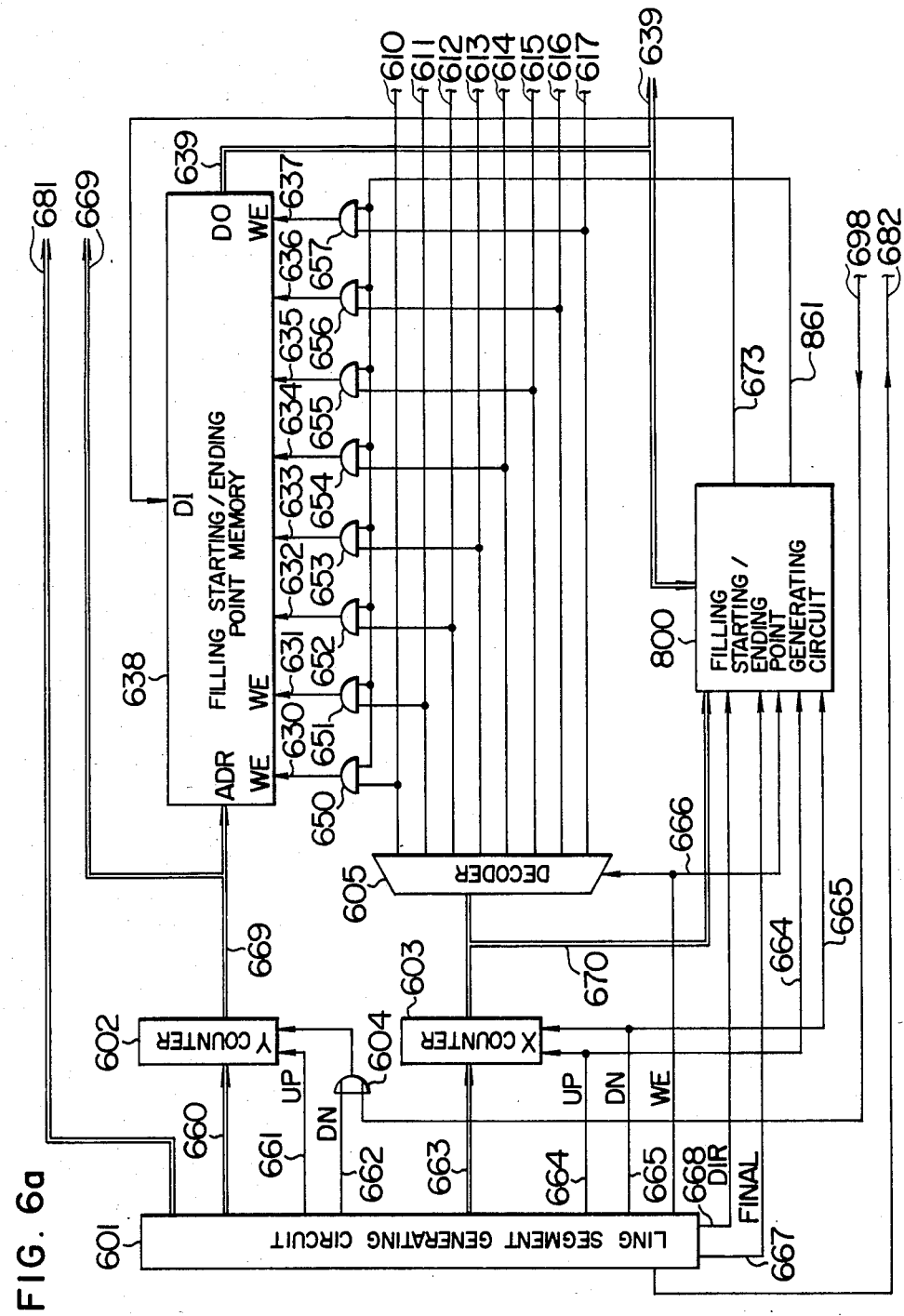
FIGS. 6a and 6b show an embodiment of a filled shape generating apparatus according to this invention.
Figure 6B:
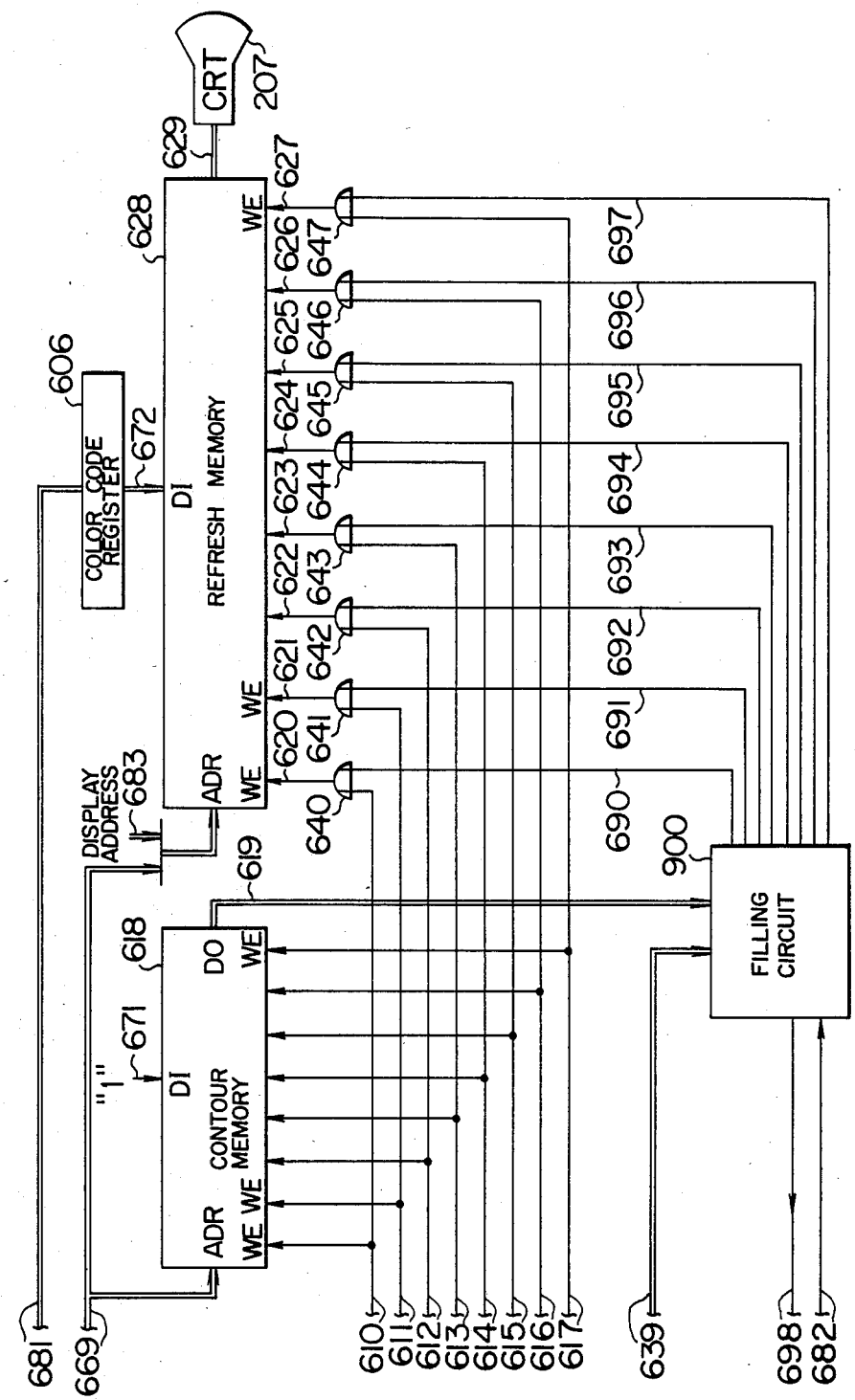

FIGS. 6a and 6b show a circuit diagram of a filled shape generating apparatus according to this invention. In these figures, numeral 601 denotes a line segment generating circuit, 602 an up/down counter for holding the address in Y direction, 603 an up/down counter for holding the address in X direction, 604 an OR gate, 605 a decoder, 606 a color code register, 628 a refresh memory, 618 a contour memory, 638 a filling starting/ending point memory, 800 a filling starting/ending point generating circuit, and 900 a filling circuit. Numerals 640-647 denote OR gates, and 650-657 AND gates. The refresh memory 628 incorporates plural planes corresponding to the depth of plural bits of the color code. And these planes of the refresh memory 628, the contour memory 618 and the filling starting/ending point memory 638 are of the same circuit structure which is shown in FIG. 7.

A display screen requires 1024 lattice dots in X and Y directions, respectively, in actual use. But, for brevity of explanation, explanation will be made on the display screen having 8 lattice dots in X and Y directions, respectively. In FIG. 7, numerals 701-708 are memory elements each thereof storing 8 bit informations corresponding to 8 lattice dots belonging to one column, which responds to 3 bits address (Y address) supplied from a line 669. 8 lattice dots informations belonging to one Y address are outputted in parallel from lines 718. The write of data into these memory elements 701-708 is carried out by selectively supplying write enable signals (WE) from lines 720-727 to the write enable inputs of the memory elements and the data to be written is supplied commonly from a line 709.

As described above, in this embodiment, each plane of the refresh memory 628, the contour memory 618, and the filling starting/ending point memory 638 are constructed so that informations on plural dots having the same Y address can be read out from or written into them, in parallel. This enables high speed write into them.

Figure 7:
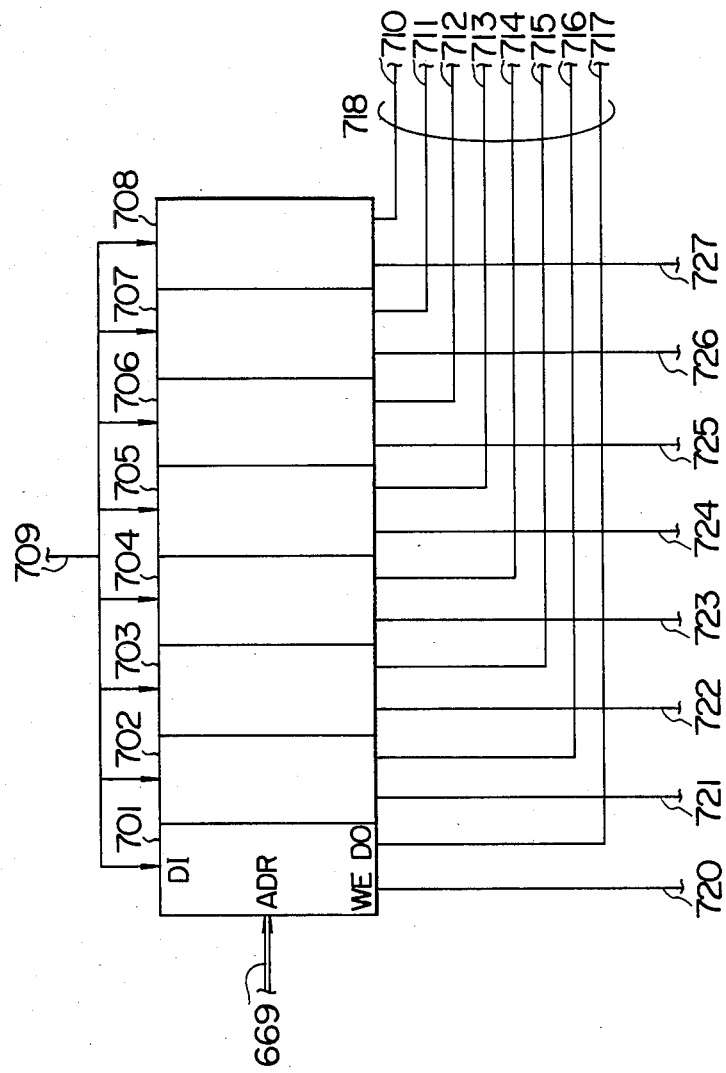
FIG. 7 shows a memory construction of the apparatus shown in FIGS. 6a and 6b.

It is assumed that the memory shown in FIG. 7 is applied to the refresh memory 628, the contour memory 618 and the filling starting/ending point memory 638 of the filled shape generating apparatus of FIGS. 6a and 6b, respectively. Then, the signal lines 720-727 correspond to signal lines 620-627, 610-617 and 630-637, respectively, while the signal line group 718 consisting of signal lines 710-717 corresponds to signal line groups 629, 619 and 639, respectively. While the write signals are not applied to the refresh memory 628, 8 bit video data in accordance with the display address from a signal line group 683 is transmitted to the CRT 207 through the signal line group 629 to display a graphic. This display address is supplied from a CRT control apparatus (not shown) and renewed sequentially by horizontal scanning. The 8 bit video data read out using the display address is converted to a serial signal synchronized with raster scanning by a parallel-to-serial conversion circuit (not shown) arranged in the CRT control apparatus and employed for video display in the CRT 207.

Incidentally, the refresh memory 628 includes plural planes and so it is evident that these planes are read out simultaneously and in synchronism with each other. The above explanation has been made on one plane of these planes.

As mentioned above, parallel-to-serial converting after reading out the informations on the plural lattice dots from the refresh memory 628 is effective to match the high scanning speed in a CRT with the low read-out speed in a memory. In this embodiment, the filling color codes are intended to be written into the refresh memory for plural dots in parallel under the condition that the above mentioned refresh memory for parallel read-out is employed. To this end, filling scanning for the dots is carried out in a perpendicular direction to display scanning direction (X direction).

Further, the memory of FIG. 7 is modified to display a display screen having 1024 dots in X and Y directions, respectively, as follows. Namely, there are used 64 RAM's each having 1 bit output with a capacity of 16K bits, and 14 bit address as an address of a line 669 (an output from the Y counter 602) so that the informations on successive 64 dots having the same Y address on the video screen are read out parallelly. For this purpose, a Y counter 602 is modified to be a 14-bit counter so that the above mentioned 14 bit address comprises an upper 10 bits correspondging to the Y address of the dot on the screen and a lower 4 bits corresponding to the most significant 4 bits of the X address of the dot. Thus, the X counter 603 is a 6-bit counter so that an address 670 for selecting 64 memory elements indicates the least significant 6 bits of the X address of the dot.

Figure 8:
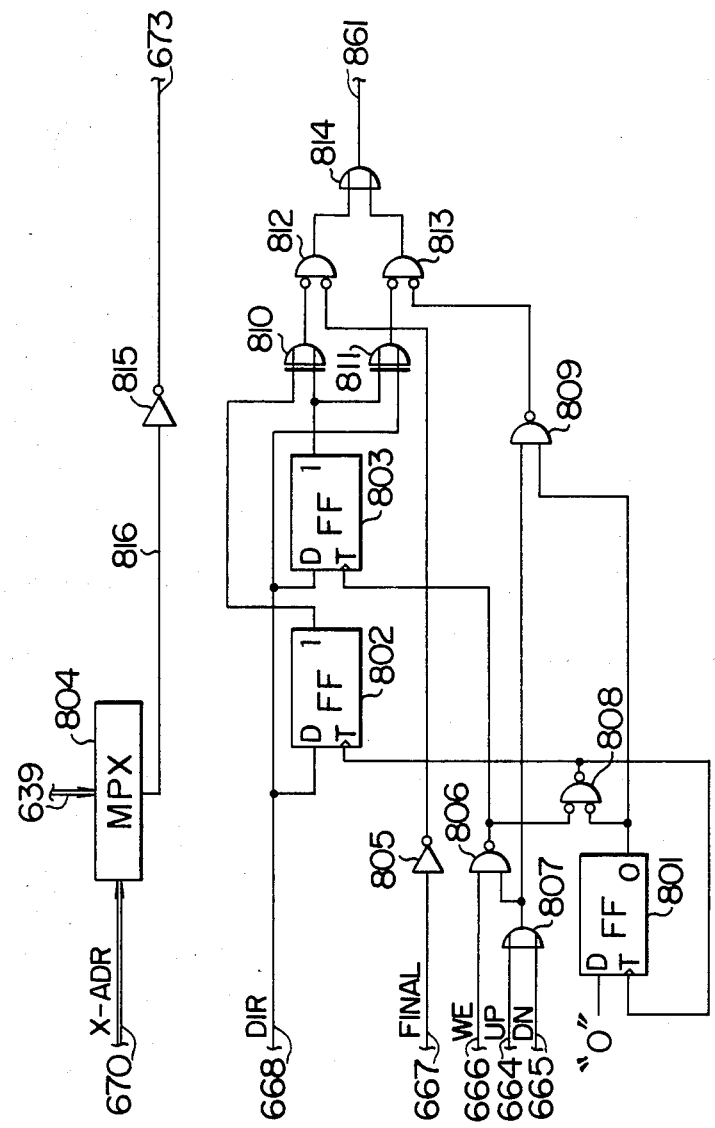

In FIG. 6a, numeral 800 denotes a filling starting-/ending point generating circuit, an internal circuit of which is shown in FIG. 8. In FIG. 8, numerals 801, 802 and 803 denote flip-flops; 804 a multiplexer; 805, 815 inverters; 806, 809 NAND gates; 807, 808, 814 OR gates; 810, 811 exclusive OR gates; and 812, 813 NOR gates.

Figure 9:
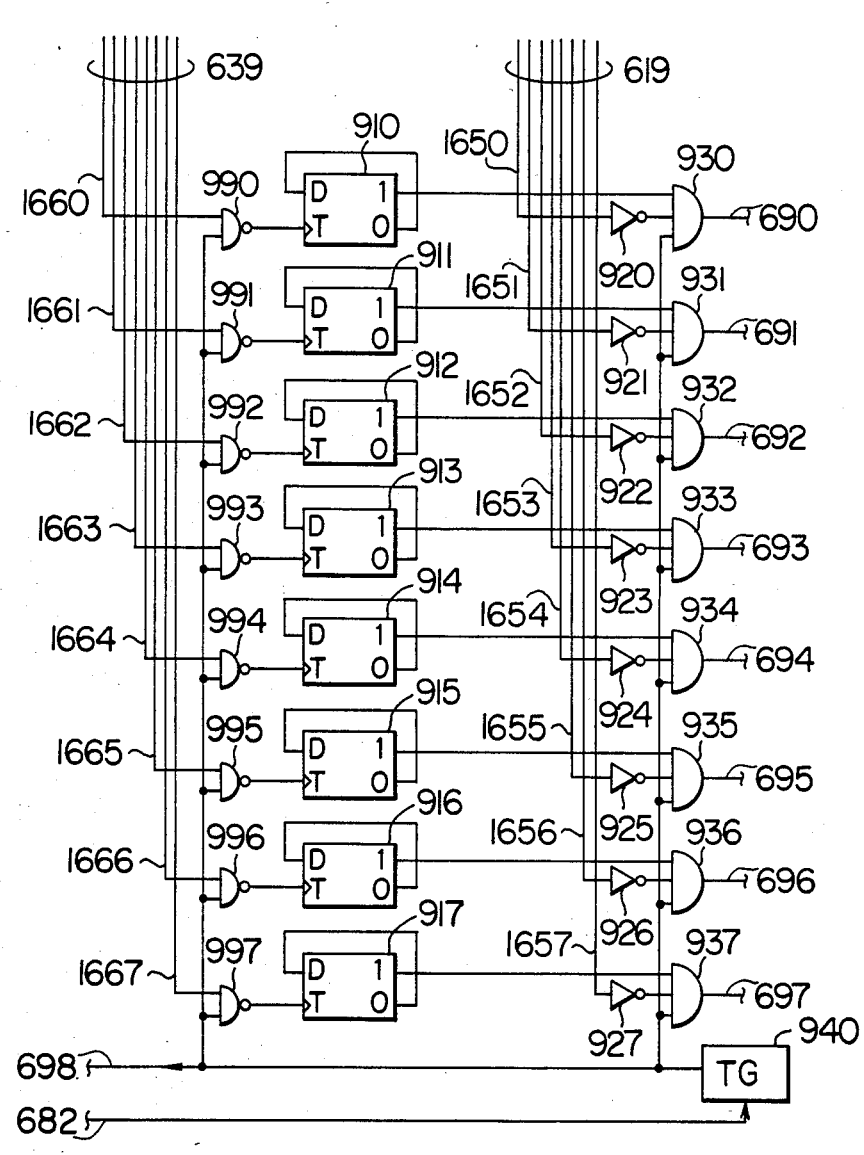
FIG. 9 shows a wiring diagram of a filling circuit in FIG. 6b.

In FIG. 6b, numeral 900 denotes a filling circuit an internal circuit of which is shown in FIG. 9. In FIG. 9, numerals 990–997 NAND gates; 920–927 inverters; 910–917 flip-flops; 930–937 three-inputer AND gates; and 940 a timing signal (or clock pulses) generating circuit. Signal lines 1650–1657 constituting the signal line group 619 hold the data read out from the contour memory 618 and correspond to bit positions of the signal lines 710–717 shown in FIG. 7. Similarly, signal lines 1660–1667 constituting the signal line group 639 hold the data read out from the filling starting/ending point memory 638, and correspond to the bit positions of the signal lines 710–717 shown in FIG. 7.

First, explanations will be made on the operations of generating dots added with the small white circles in FIG. 5 in the refresh memory 628; white circled dots in FIG. 1 in the contour memory 618; and white circled dots in FIG. 4 in the starting/ending point memory 638 in that order. Next an explanation will be made on the operation of writing the filling color code at the dots added with the small black circles in FIG. 5 in the refresh memory 628 by the filling circuit 900.

Figure 10:
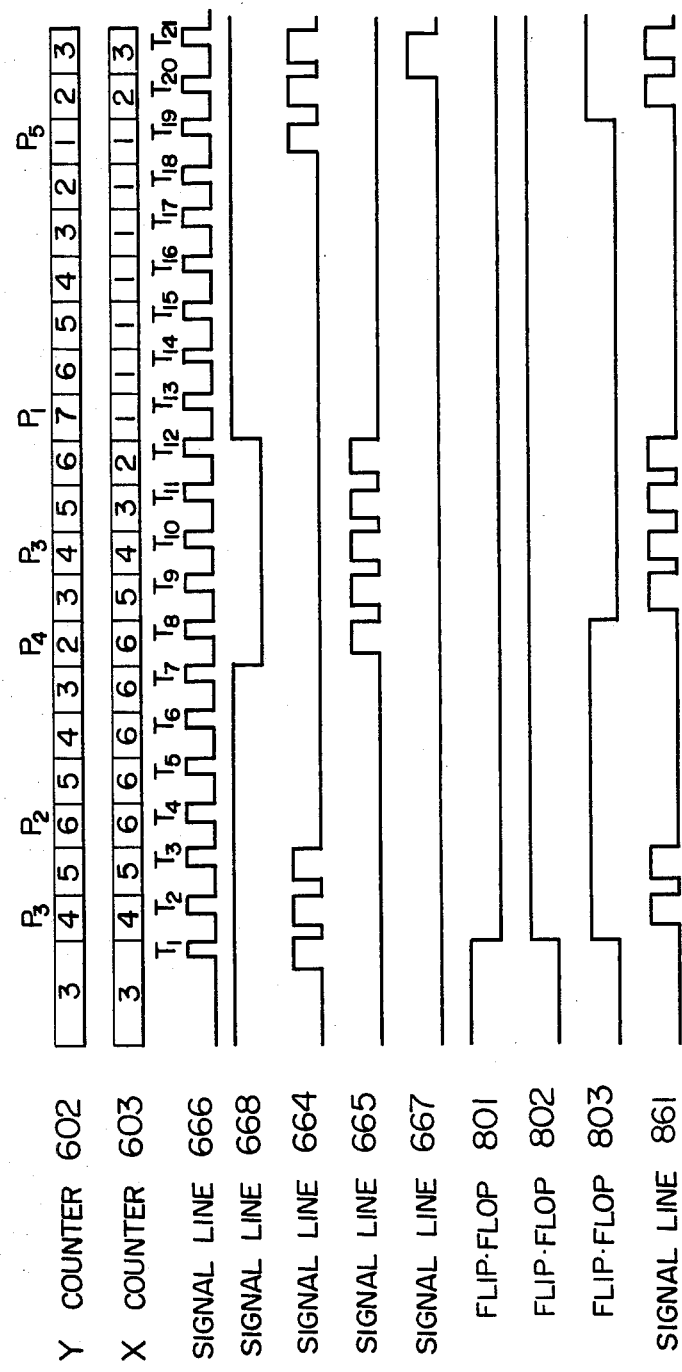
FIG. 10 shows a timing chart generating a starting-/ending point of filling.
Figure 12:
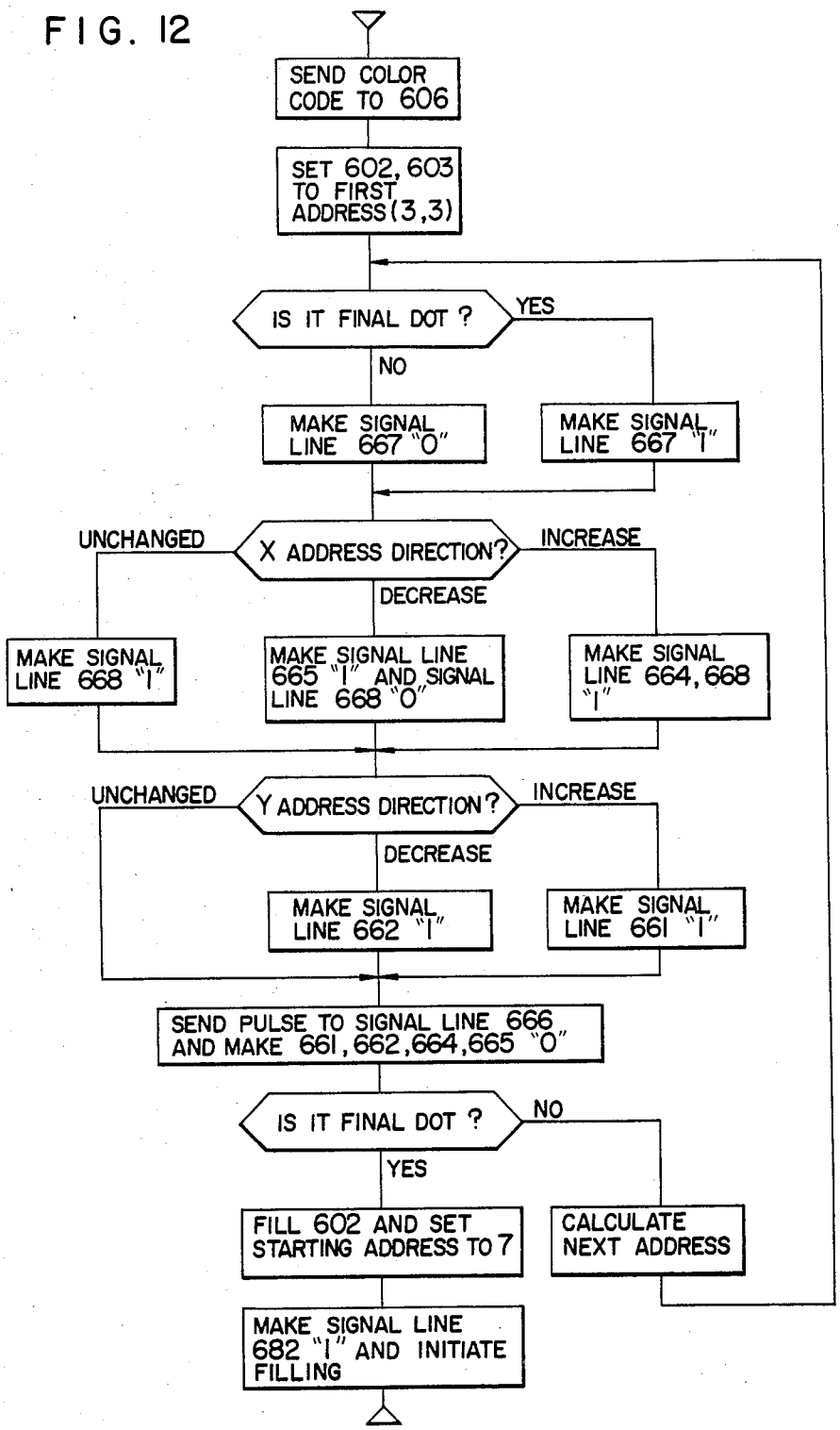

FIG. 10 shows a timing chart of generating dots in the refresh memory 628, the contour memory 618 and the filling starting/ending point memory 638. The line segment generating circuit 601 is constructed by an ordinary microcomputer the program of which is shown in FIG. 12. The renewal of the dot position necessary to generate a line segment can be carried out by the method by Bresenham. The detail of the program is described in the article: Bresenham J. E. "Algorithm for Computer Control of a Digital Plotter" IBM Sys. J. 4(1), 25–30, 1965.

The variation of the signal lines forwarded from the line segment generating circuit 601 in accordance with the program of FIG. 12 are shown in FIG. 10. The line segment generating circuit 601 sets the color code of the contour in a color code register 606 through a signal line 681 (1201 of FIG. 12). Next, the Y address 3 of the first dot P(3,3) of the contour is set in the Y address counter 602 through the signal line group 660 while the X address 3 is set in the X address counter 603 through the signal line group 663 (1202 of FIG. 12). The signal line 666 sends a write signal to the memories which has a pulse waveform as shown in FIG. 10. When the write signal is inputted, the decoder 605 decodes the X address in the X address counter 603 to produce a write signal to one decode output signal line addressed by the X address of decode output signal lines 610–617. Namely, in the present case, the X address is 3, and so the write signal is produced on the signal line 613 at the timing of $T_1$ of FIG. 10. This write signal is supplied to the refresh memory 628 through the OR gate 643 and the output line thereof 623. The Y address 3 is addressed by a signal line 669, and thus the contour color code from the color code register 606 is written into the refresh memory 628 at the position P(3,3) shown in FIG. 5. On the other hand, the write signal from the line 613 is also supplied to the contour memory 618 and the Y address 3 is addressed by the signal line 669. Thus, a bit "1" assigned by the signal line 671 is written into the contour memory 618 at the position P(3,3) indicated in FIG. 1. Further, the write signal from the line 613 is also supplied to the filling starting/ending point memory 638 through the AND gate 653 and the output line thereof 633. Another input signal 681 to the AND gate 653 is an output signal from the filling starting/ending point generating circuit 800, and the write is effected to the filling starting/ending point memory 638 only when this output signal 681 is valid or "1". The data 673 to be written into the filling starting/ending point memory 638 at this time is an output 673 from the inverter gate 815 in FIG. 8. The input of the inverter gate 815 is connected to the output of the multiplexer 804. The multiplexer 804 takes out one signal line assigned by the signal line group 670 indicating the X address among the signal line group 639. The filling starting/ending memory 638 outputs the plural bits data in row 3 (Y address 3) based on the Y address before the write signal is supplied the line 633. Thus, the inverted bit of the data at the position P(3,3), i.e. bit "1" is produced to the signal line 673 and supplied to the filling starting/ending point memory 638 as a write data.

Explanation will be made on the condition that the write permit signal on the line 861 to the filling starting-/ending memory 638 is valid or enable referring to FIGS. 8 and 10.

The signal line 666 of FIG. 8 is a write signal to the memories. The signal line 668 supplied from the line segment generating circuit 601 indicates the direction of the contour. When the line segment is advancing in X direction (that is, the X address increases) or does not change in X direction (that is, the line segment shifts in vertical direction), the signal line 668 is "1" (1210 of FIG. 12). In contrast, when the line segment is advancing negatively in X direction (that is, the X address decreases), the signal line 668 is "0" (1209 of FIG. 12). Now, the X address at the position P(3,3) is advancing positively and so the signal line 668 is "1". The signal lines 664 and 665 indicate a count-up signal and a count-down signal supplied to the X address counter 603, respectively. The X address counter 603 are counted up or counted down by the falling edges of these signals. The signal line 667 from the line segment generating circuit 601 is "1" when a final dot of the contour making a shape appears (1205 of FIG. 12). In this embodiment, the signal line 667 is "1" when the final dot P(3,3) is written. The flip-flop 801 in FIG. 8 is initially set to a value "1", and reset after it once sends a set pulse is to the flip-flop 802. The flip-flop 802 stores the direction of the first dot constituting a shape in X direction when it is written. The flip-flop 802 thus stores the direction of the dot in X direction assigned by the signal line 668 using the write signal 666 only when the flip-flop 801 is set and the signal lines 664 and 665 are "1". The flip-flop 803 stores the direction in X direction of the dot just before the dot to be written and stores the direction in X direction of the dot assigned by the signal line 668 when the signal line 664 or 665 is "1" and the write signal 666 is valid. In other words, the set signal to the flip-flop 803 is not valid when both the signal lines 664 and 665 are "0", that is, the line segment shifts in the vertical direction. An input of the exclusive OR gate 811 is connected to the signal line 668 and the flip-flop 803 and the output of the exclusive OR gate is "0" or "1" depending on whether the direction in X direction of the dot of this time and that of the dot of the last time are alike or different, respectively. An output of the NOR gate 813 is "1" when both inputs are "0". In this case, the output of the NOR gate is "1" when the direction in X direction of the dot of this time and that of the dot of the last time are different, the dot of this time is not the first dot and a count pulse is produced from the signal line 664 or 665. An input of the exclusive OR gate 810 is connected with the flip-flops 802 and 803, and the output thereof is "0" when the direction in X direction of the first dot and that of the dot of the last time are alike. The output of the NOR gate is "1" when these directions are alike and the signal line 667 indicating the final dot of the area is "1". The signal line 861 is a ligical sum (OR) of the above NOR gates 812 and 813. The signal line 861 becomes "1" at the timing illustrated in FIG. 10, which enables the write to the filling starting-/ending memory 638.

As described above, with the first dot P(3,3) of the contour the flip-flop 801 is in set condition and so the signal line 861 is not valid so that the write to the filling starting/ending point memory 638 is not effected.

Further, the line segment generating circuit 601 counts up or down the Y address counter through the signal line 661 or 662 (1213, 1214 of FIG. 12) and counts up or down the X address counter through the signal line 664 or 665 (1209, 1210 of FIG. 12). Thus, with the write signal 666 (1215 of FIG. 12) the contour color code produced from the color code register 606 is written into the refresh memory 628 at the positions added with the small white circles illustrated in FIG. 5 and the bit "1" assigned by the signal line 671 is written into the contour memory 618 at the positions added with the white circles. At the same time, with the signal line 861 being "1", the write signal to the filling starting/ending memory 638 is valid and so the inverted data of the readout data from the filling starting/ending memory 638 is written in the same address of the filling starting-/ending point memory 638. Thus, the bit "1" is written into the filling starting/ending point memory at the positions added with the white circles illustrated in FIG. 4. For the position P(4,4) in FIG. 4, the bit "1" is written at the timing of $T_2$ of FIG. 10 and rewritten at the timing of $T_{10}$ of FIG. 10 with the result that the bit "0" is written for the position P(4,4). In FIG. 4, the signal lines 664 and 665 are invalid for the positions P(6,6), P(6,5), P(6,4) and P(6,3), and the output of the exclusive OR gate 811 is "1" for the portion P(6,2). Similarly, the signal lines 664 and 665 are invalid for the positions P(1,7), P(1,6), P(1,5), P(1,4), P(1,3), and P(1,2) and the output of the exclusive OR gate 811 is "1" for the position P(1,1). Thus, the write permit signal 861 is not valid for these positions so that the pertinent bits of the filling starting/ending point memory 638 remain the bit "0" of the initial value. For the position P(3,3) in FIG. 4, the signal line 861 is invalid at the first point of the circulation of the contour i.e. $T_1$ since the flip-flop 801 remains set. But, it becomes valid at the final point of the circulation i.e., $T_{21}$ since the output of the exclusive OR gate 810 is "0" and the output of the inverter gate 805 is also "0". Thus, the bit "1" is written at the position P(3,3) at the end of the circulation.

As described above, the filling starting/ending point generating circuit generates an array of dots, with the maximum/minimum dots and the dot turning from the vertical direction and back to the horizontal direction being removed from the filling starting/ending point memory 638.

Explanation will be made on the operation in which the filling color code is written in the refresh memory 628 at the dots added with the small black circles illustrated in FIG. 5 by the filling circuit 900.

Figure 11:
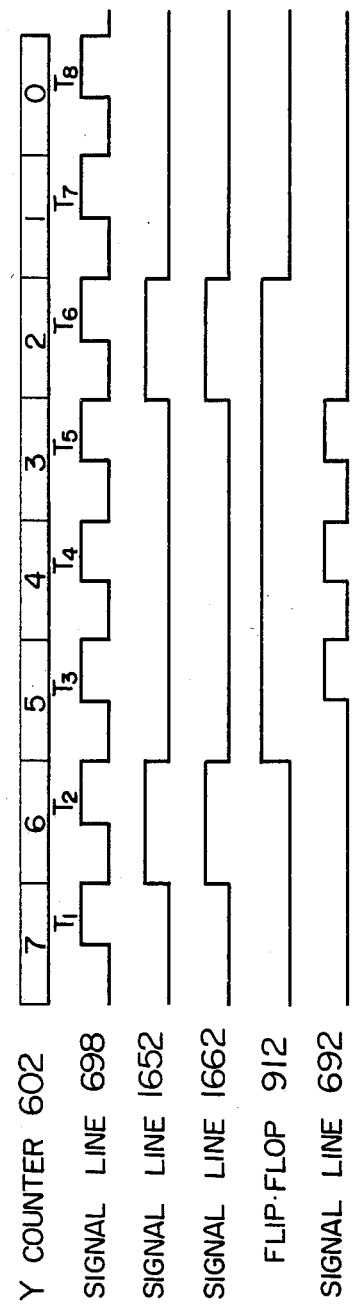
FIG. 11 is a timing chart of filling by the filling circuit in FIG. 9.

The filling circuit 900 in FIG. 9 incorporates bit filling circuits arranged in parallel corresponding to the X addresses, which can simultaneously and parallelly carry out the filling for an array of 8 dots corresponding to the same Y address. For brevity of explanation, the example of filling one column (the column of the X address 2 in FIG. 5) will be explained. The initiation of filling is carried out in 1218 of FIG. 12 in which the timing generating circuit 940 of FIG. 9 produces a refresh memory write signal 698 as shown in FIG. 11 in response to the signal line 682. The flip-flops 910-917 of FIG. 9 remain reset in the initial condition thereof. The signal line 1652 is a data line corresponding to the X address 2 among the signal line group 619. The signal on the line 1652 indicates a data corresponding to the X address 2 stored in the contour memory 618. The signal line 1662 is a data line corresponding to the X address 2 among the signal line group 639. The signal on the line 1662 indicates a data corresponding to the X address 2 stored in the filling starting/ending point memory 638. Now, the Y address counter 602 is set to an initial value 7 (1217 of FIG. 12). Thus, the bit "0" is written in both the contour memory 618 and the filling starting/ending memory 638 at the position P(2,7) so that both the signal lines 1652 and 1662 are "0". The flip-flop 912 remains reset so that the write pulse does not occur on the signal line 692 even when the write pulse occurs on the signal line 698 at the timing of $T_1$. Further, the signal line 698 is an input of the OR gate 604 in FIG. 6a and so counts down the Y address counter 602 at the falling edge of this signal 698. Thus, the data at the position P(2,6) in the contour memory 618 and the filling starting/ending point memory 638 is read out and the bit "1" appears on the signal lines 1652 and 1662. The flip-flop 912 still remains reset so that the write pulse does not occur on the signal line 692 at the timing of $T_2$. But, since the signal line 1662 is "1" so that the NAND gate 992 is valid at the timing of $T_2$ and the flip-flop 912 is set at the falling edge of this signal 1662 at $T_2$. The signal 698 counts down the Y address counter 602. Thus, the data at the position P(2,5) in the contour memory 618 and the filling starting/ending memory 638 is read out and the bit "0" appears on the signals 1652 and 1662. Since the flip-flop 912 remains set and the signal line 1652 is "0", the write signal pulse occurs on the signal line 692 at the timing of $T_3$. This write signal pulse is supplied to the refresh memory 628 through the OR gate 642 of FIG. 6b so that the filling color code generated by the line segment generating circuit 601 and stored by the color code register 606 is written from the register 606 into the refresh memory 628 at the position P(2,5) illustrated in FIG. 5. Similarly, the filling color code is written at the positions P(2,4) and P(2,3) illustrated in FIG. 5. Further, at the timing of $T_6$, the flip-flop remains set while the signal line 1652 is "1". Thus, the AND gate 932 is not valid so that the write signal pulse does not occur on the signal line 692. The NAND gate 992 becomes valid at the timing of $T_6$ so that the flip-flop is inverted at the falling edge of $T_6$ and reset. Namely, the write signal pulses occur on the signal line 692 for the dots ranging from the next dot after the bit "1" of a dot is once read out from the filling starting-/ending point memory 638 to the dot before the bit "1" of another dot is read out again, excepting the dots corresponding to the dots of the contour memory being a "1". In this way, by excluding the contour itself from the filling area, the filling only the interior of the contour is enabled even when plural contour line segments appear during filling scanning.

The above explanation has been made on the filling circuit 900 referring to the column of the X address 2 of FIG. 5 as an example. But, the filling circuit according to this invention carries out the above operation for the data corresponding to all the X addresses for one Y address and so the positions P(3,4) and P(5,4) are also filled in parallel at the timing of $T_4$. Thus, the contour color code is written at the dots added with the small white circles in FIG. 5, and the filling color code is written at the dots added with the small black circles in FIG. 5. This enables the generation of a filled complete shape.

By clearing the filling starting/ending point memory after the above operation, the interior of another shape can be filled in superposition with the area of the first shape. However, the contents of the contour memory 618 are not necessarily cleared for each shape. Thus, the contour memory 618 can accumulate the contour data sequentially. In this way, the filling data or color code is not written in the refresh memory 628 at the pertinent positions corresponding to the dots being "1" in the contour memory 618, and so the dots with the contour data being once written in the refresh memory 628 are not erased by the subsequently generated filling colors. Thus, the contour data written in the refresh memory 628 is always held.

On the other hand, every newly received contour data may be successively written into the refresh memory 628 regardless of the previously written contour data. In this way, even with plural areas of shapes being overlapped, the display color codes of the written contours are maintained regardless of the filling operation. But, when the contours are overlapped with each other, the color display code of the subsequently written contour data prevails at the overlapped position. In this case, when the refresh memory 628 receives the new contour data, the contour memory 618 is read out. And if the read-out data is "1", the pertinent dot means an overlapping point. Thus, by taking a logical operation, for example, a logical sum of the display color codes of the new contour data and that already written in the refresh memory 628, and rewriting the result in the refresh memory 628, another display color code can be employed for the overlapped portion of the contours having different display color codes.

One modification of the filled shape generating apparatus of FIGS. 6a and 6b will be proposed. It is a construction in which the filling starting/ending point memory 638 is replaced by the refresh memory 628. In this case, when the line segment generating circuit 601 produces a coordinate value (address) $P_k(x_k, y_k)$, the pertinent content to this address in the contour memory 618 is read out. And, if this content is "0", it is inverted to "1". At the same time, the content at the same address of the plane for replacement in the refresh memory 628 is set to "1" regardless of the already written content. On the other hand, when the read-out content of the contour memory 618 is "1", the content of the plane for replacement is inverted. When the write of an entire contour is finished, the filling circuit 900 reads out the contour memory 618 and the plane for replacement for each row. By detecting the contents of the plane for replacement corresponding to the lattice dots being "1" in the contour memory, the contour of a shape and the starting/ending point of filling can be found as in the embodiment mentioned above. However, in this case, the entire contour memory 618 is cleared to "0" whenever the operation of the filling circuit 900 is completed. Thus, if plural shapes are overlapped, the contour data or color code previously written in the refresh memory 628 may be affected by the filling data or color code subsequently written and so the display code thereof may change. Therefore, in order to obtain the display code of the contour, which is not affected by the filling operation, in the refresh memory 628, it is necessary to generate only the contour data again after the filling of the entire shapes is completed, and rewrite them in the refresh memory 628.

Another modification of the filled shape generating apparatus is a construction in which the contour memory 618 is omitted as shown by dotted line in FIG. 2. In this modification, the filling starting/ending memory 638 is not replaced by the refresh memory 628. If the same operation as that in FIGS. 6a and 6b is carried out for this modified circuit construction, correct filling is not made because the contour may be filled partially. But only the dots on the contour itself are influenced. Thus, if after the filling operation is carried out for the entire shapes, the contour data are generated again to be written in the refresh memory 628, the same effect as in the two embodiments as mentioned above results.

As explained above, according to the embodiments of this invention, the contour data of the area generated as an array of dots on two dimensional lattice are received to fill the lattice dots encircled by the array. And any shape such as a concave, convex, doughnut or shape having a constriction can be filled in the interior of the contour thereof. There is provided a filled shape generating apparatus in which even when plural shapes are overlapped, a previously generated contours will not be filled by a subsequently generated shape. Further, the parallel filling of plural lattice dots enables high speed filling.

We claim:

1. An apparatus for generating a filled shape comprising:
 (a) a refresh memory for storing a color code of each of dots constituting a two dimensional picture image;

(b) means for displaying the image by reading out the refresh memory sequentially by scanning said refresh memory in a first scanning direction;

(c) a line segment generating circuit for sequentially generating a coordinates position of each of dots on a closed contour of a shape to be displayed and a color code of the contour;

(d) a contour memory for storing first information at its memory locations corresponding to the dots on the contour of the shape;

(e) means for writing the contour color code in the refresh memory at its memory locations addressed by the dot coordinates positions generated by said line segment generating circuit;

(f) a filling starting/ending point memory for storing second information at its memory locations corresponding to dots being a starting point or ending point for filling in a second scanning direction;

(g) means for detecting the dots being the starting point or ending point for filling by the coordinates positions of the dots generated by said line segment generating circuit and writing the second information in the filling starting/ending point memory at the memory locations of the detected dots;

(h) means for sequentially reading out signals stored at memory locations of said filling starting/ending point memory corresponding to dots being starting or ending points, said dots arranged in the second scanning direction, and for generating a filling signal when a first one of said dots is read out and ending said filling signal when the next dot is read-out, said filling signal being alternately generated and ended upon the reading of subsequent dots; and (i) means for scanning the contour memory in synchronism with the scanning of the filling starting-/ending point memory in said second scanning direction and selectively invalidating the filling signal so as to write a filling color code in the refresh memory only at its memory locations corresponding to said filling signal excepting said first information.

2. An apparatus for generating a filled shape according to claim 1, wherein said second information writing means includes means for writing inverted information of the information previously stored in the filling starting/ending point memory at the memory locations in which said second information is stored.

3. An apparatus for generating a filled shape according to claim 1, wherein said second scanning direction is perpendicular to said first scanning direction.

4. An apparatus for generating a filled shape according to claim 3, wherein said second information writing means includes means for writing said second information for the dots on the contour excluding maximum and minimum dots with respect to said first scanning direction, and a group of dots arranged in said second scanning direction, a final dot thereamong being written when a direction from a dot one dot before the group to a first dot of the group and a direction from a last dot of the group to a dot one dot next the group are the same.

5. An apparatus for generating a filled shape according to claim 1, wherein said second information writing means erases the second information written about a previous contour and then writes the second information about a subsequent contour making another shape when said line segment generating circuit generates the dot coordinates positions and the contour color code about the subsequent contour, while said contour memory accumulates said first information of the successive contours.

6. An apparatus for generating a filled shape comprising:

(a) a refresh memory for storing a color code of each dot constituting a two dimensional picture image;

(b) means for displaying the image by reading out the refresh memory sequentially by scanning said refresh memory in a first scanning direction;

(c) a line segment generating circuit for sequentially generating a coordinates position of each of dots on a closed contour of a shape to be displayed;

(d) a filling starting/ending point memory for storing predetermined information indicating that said each dot is a starting point or ending point for filling in a second scanning direction;

(e) means for writing the first information into the filling starting/ending point memory at only its memory locations corresponding to the dots to be the starting point or ending point for filling;

(f) means for scanning the filling starting/ending point memory in a second scanning direction which is perpendicular to said first scanning direction to sequentially read out the stored information on dots arranged in said second scanning direction, reading out of the stored information being effected simultaneously on plural dots arranged in said first scanning direction;

(g) means for generating filling signals which respectively correspond to lines extending in said second scanning direction and including respective ones of plural dots to be read out simultaneously by said filling starting/ending point memory scanning means, said filling signals being generated when one of said dots is read out and ending when the next dot is read out, said filling signal being alternately generated and ended upon the reading out of subsequent dots; and (h) means for successively writing filling color codes parallelly in the refresh memory at the dot positions arranged in said first scanning direction on the basis of the plural filling signals generated from the filling signal generating means.

7. An apparatus for generating a filled shape comprising:

(a) a refresh memory for storing a color code of each of dots constituting a two dimensional picture area;

(b) means connected to said refresh memory, for displaying the picture area by sequentially scanning said refresh memory in a first scanning direction;

(c) a line segment generating circuit connected to said refresh memory, for successively generating a signal representing a coordinates position of each of dots on a contour of a shape to be displayed on the picture area, and color codes of the contour and filling, said contour color code being stored at memory locations of dots corresponding to the contour of the shape in said refresh memory;

(d) means connected to said line segment generating circuit and responsive to the generated coordinates position signals, for successively generating an information signal representing a dot being a starting point or an ending point for filling in a second scanning direction;

(e) a filling starting/ending point memory connected to said filling starting/ending point signal generating means, for storing the information signals at memory locations of the corresponding dots; and (f) means connected to said line segment generating circuit, said filling starting/ending point memory and said refresh memory, for writing the filling color code in the refresh memory at memory locations of dots from a dot one dot next to each of starting points determined by said filling starting-/ending point memory to a dot one dot before a corresponding one of an ending point corresponding to each starting point and determined by said filling starting/ending point memory, based upon the information signals stored in said filling starting/ending point memory and based upon the coordinate positions of dots on a contour of said shape generated by said line segment generating circuit, said information signal being generated when one of said dots is read out and ending when the next dot is read out, said information signal being alternately generated and ended upon the reading out of subsequent dots.

8. An apparatus according to claim 7, wherein said writing means includes:

a contour memory connected to said line segment generating circuit, for storing a predetermined signal at its memory location corresponding to dots on the contour of the shape; and means connected to said contour memory and said filling starting/ending point memory for generating the filling signals, based upon the information signals stored in said filling starting/ending point memory and based upon the coordinate positions of dots on a contour of said shape generated by said line segment generating circuit.

* * * * *